Oct. 19, 1965     J. P. SHANOK     3,212,148
TRIM STRIP
Filed Jan. 2, 1964
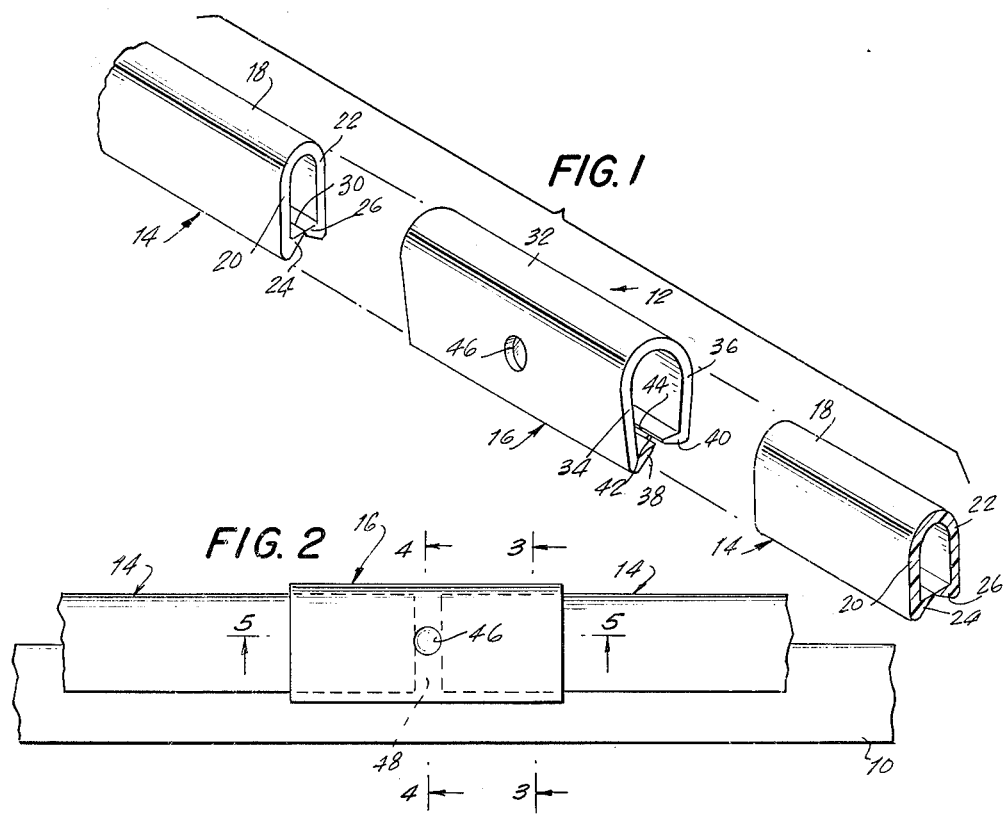
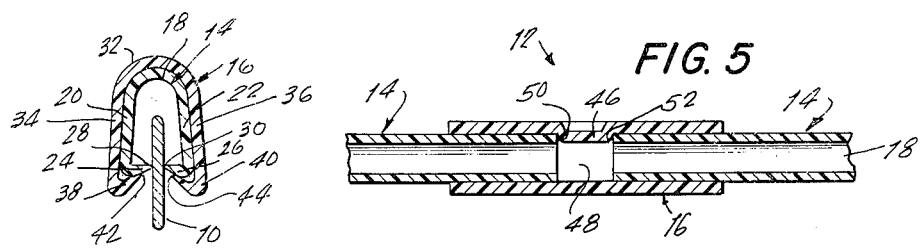
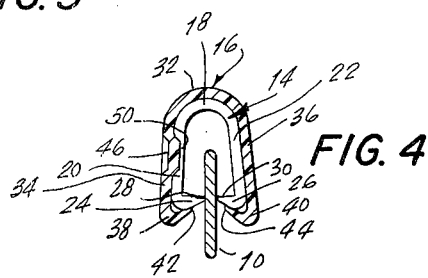
INVENTORS
JESSE P. SHANOK
BY Friedman & Goodman
ATTORNEYS ROK# United States Patent Office 3,212,148
Patented Oct. 19, 1965

3,212,148
TRIM STRIP
Jesse P. Shanok, 863 65th St., Brooklyn, N.Y.
Filed Jan. 2, 1964, Ser. No. 335,252
1 Claim. (Cl. 24—73)

The present invention relates generally to trimming means and in particular to a coupling element therefor.

The peripheral edges of various elements such as for example, and not by way of limitation, metallic strips or glass sheet members are frequently covered with decorative trim members. The abutting edges of the decorative trim members frequently detract from the overall decorative appearance attempted to be achieved by the utilization of the trim members. Various attempts have been made in the prior art to cover or otherwise camouflage the abutting ends of such decorative trim members; however, such attempts have been generally unsuccessful, either due to the fact that they required relatively expensive coupling elements or the fact that they required coupling elements which had to be permanently secured to the abutting trim members so as to result in an increased cost resulting from the necessity of securing the coupling members to the adjacent trim members.

It is an object of the present invention to provide a trim assembly of the character described in which the various disadvantages of the prior art are obviated.

It is another object of the present invention to provide a coupling element for trim members which need not be secured to the adjacent trim members but which nevertheless is retained in position overlying the abutting edges of the trim members so as to conceal the latter without any securement thereto.

It is a further object of the present invention to provide a coupling member for trim members of the described type which can be manufactured and sold at a relatively low cost and which nevertheless is highly efficient in operation and use.

Other and further objects and advantages of the present invention will become readily apparent to those skilled in the art from a consideration of the following specification taken in connection with the appended drawings.

In the drawings which illustrate the best mode presently contemplated for carrying out the present invention:

FIGURE 1 is an exploded view of a trim assembly pursuant to the present invention;

FIGURE 2 is a side elevation of the trim assembly positioned on a metallic element or the like;

FIGURE 3 is a sectional view taken on the line 3—3 of FIGURE 2;

FIGURE 4 is a sectional view taken on the line 4—4 of FIGURE 2; and

FIGURE 5 is a sectional view taken on the line 5—5 of FIGURE 2.

Referring now to the drawings in detail, there is shown a metallic element 10 which is to be provided with the trim assembly generally indicated by the reference numeral 12 pursuant to the present invention. As here shown, the metallic element 10 is an elongated member which for example and not by way of limitation may constitute a finishing member on a suitable part of an automobile or the like. The trim assembly 12 is mounted on the metallic element 10 so as to provide a highly decorative finish therefor. As here shown, the trim assembly 12 is constituted by cooperating trim members 14—14 the abutting ends of which are covered or concealed by the coupling members 16.

The trim members 14 and the coupling members 16 are preferably constituted by extrusions of a suitable plastic material. As here shown, the trim members 14 are elongated elements each of which is provided with an arcuate spine 18 from which there extends the parallel walls 20 and 22. The substantially parallel walls 20 and 22 terminate along their free marginal edges in the inwardly directed gripping fingers 24 and 26 respectively. As best seen in FIGURE 1, the confronting gripping fingers 24 and 26 terminate in the pointed edges 28 and 30 respectively which in the unmounted condition of the trim members are in abutment. It will be understood that the trim members 14 have sufficient inherent resiliency to urge said pointed edges 28 and 30 into engagement with each other.

The coupling member 16 is similar in conformation to the trim members 14, being complementary thereto, but being of larger dimensions than the latter. The coupling member 16 is provided also with a spine 32 and with the companion substantially parallel side walls 34 and 36 which extend from the spine 32. The free marginal edges of the side walls 34 and 36 are provided also with the companion gripping fingers 38 and 40. Said gripping fingers are also in confronting relation and are provided with the confronting pointed edges 42 and 44 respectively.

Pursuant to a highly novel feature of the present invention, one of the companion side walls of the coupling member 16 is embossed so as to provide as best shown in FIGURE 4 a projection or dimple 46 which is integrally formed in the side wall 34 at the inner surface thereof.

In order to mount the trim assembly 12 on the element 10, the trim members 14 are first mounted thereon. This is accomplished by spreading apart the gripping fingers 24 and 26 so as to seat the trim members 14 on the element 10. It will be apparent that, due to the inherent resiliency of the walls 20 and 22 of the trim members 14 when the walls are spread apart so as to move the fingers 24 and 26 apart from each other, the walls are stressed with the result that when the members are seated on the elements 10 as shown in FIGURE 4 the pointed edges 28 and 30 of said fingers are urged against the element 10 so as to securely seat the trim members on the element 10. When the trim members 14 are seated on the element 10, the adjacent confronting edges 50 and 52 thereof are spaced apart so as to provide a spacing or space 48 therebetween as best shown in FIGURES 2 and 5. The coupling member 16 is now seated so as to cover the space 48 between the adjacent ends of the trim members 14. More specifically, as previously indicated, the coupling member 16 is of larger dimensions than the trim members 14 and is complementary thereto so that the walls of the coupling member can be spread apart and the latter seated on the pair of trim members 14 so that the detent or projection 46 extends into the space 48 as shown for example in FIGURES 2, 4 and 5. When so seated, the coupling member firmly encompasses the underlying portions of the trim members 14 and is firmly engaged therewith due to the inherent resiliency of the coupling member. More specifically, as best shown in FIGURES 3 and 4, the spine 32 of the coupling member 16 is firmly engaged with the underlying spines 18 of the trim members and the side walls 34 and 36 of the coupling member firmly engage the underlying side walls of the trim members. In addition, the gripping fingers 38 and 40 of the coupling member engage and press against the gripping fingers of the trim members, as best shown in FIGURES 3 and 4. Due to the fact that the detent 46 extends into the space 48 so that the detent is seated between the confronting edges 50 and 52 of the trim members, it will be apparent that lateral displacement of the coupling member longitudinally of the trim members is prevented. In addition, due to the engagement of the gripping fingers of the coupling member on the gripping fingers of the trim members, it being noted in FIGURES 3 and 4 that the gripping fingers of the coupling member are directed upwardly when the walls of the coupling member are spread apart, it will be apparent that the disengagement of the coupling member in a direction outwardly of the trim members is prevented.

It will be apparent that various changes and modifications may be made in the present invention without however departing from the inventive concept thereof as set forth in the appended claim.

What is claimed is:

A trim assembly comprising a pair of elongated trim elements mounted in spaced endwise relation to define a space between the confronting ends thereof, and a coupling member encompassing the adjacent ends of said trim elements, said coupling member having detent means extending into said space so as to retain said coupling member against displacement longitudinally of said trim elements, said trim elements each having a spine and a pair of substantially parallel walls extending from said spine, each of said walls having an inwardly directed gripping finger, said gripping fingers being biased together, and said coupling member having a conformation complementary to said trim elements and being provided with companion gripping fingers which overlie the gripping fingers of said trim elements and are directed toward the spines of said trim elements so as to prevent inadvertent disengagement of said coupling member outwardly of said trim elements.

References Cited by the Examiner

UNITED STATES PATENTS

| 1,535,294 | 4/25 | Collins | 285—417 X |
| 1,995,616 | 3/35 | Kamack | 285—417 X |
| 1,999,398 | 4/35 | Clarke | 150—29 X |
| 2,457,796 | 12/48 | White | 285—417 X |
| 2,946,364 | 7/60 | White | 150—28 |

FOREIGN PATENTS

| 1,198,536 | 6/59 | France. |
| 157,520 | 1/21 | Great Britain. |

DONLEY J. STOCKING, *Primary Examiner.*